Oct. 27, 1953     J. W. GRENIER     2,656,904
CLUTCH AND BRAKE CONTROL FOR ENDLESS TRACK VEHICLES
Filed June 7, 1950                3 Sheets-Sheet 1
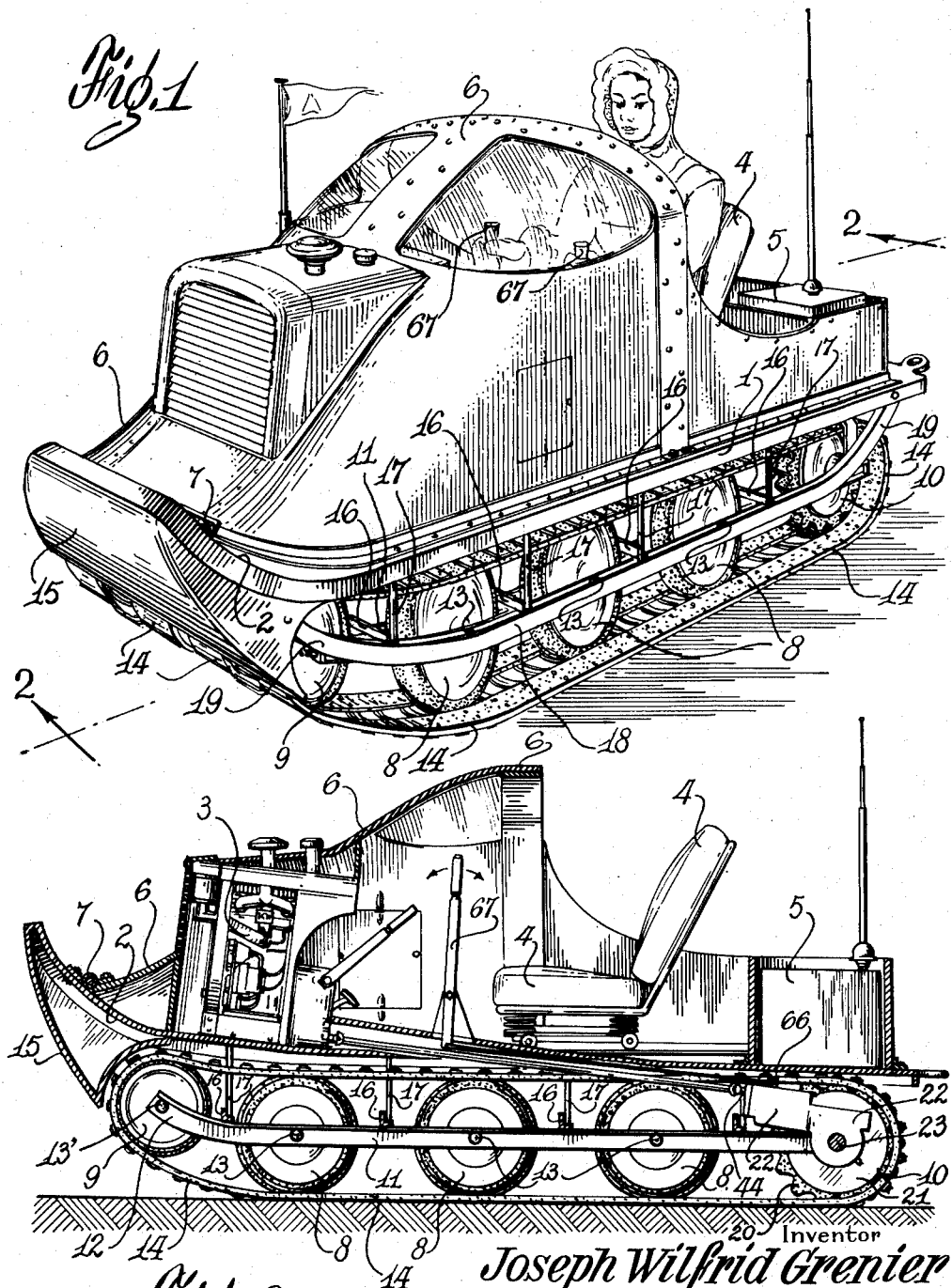
Inventor
Joseph Wilfrid Grenier
Attorneys

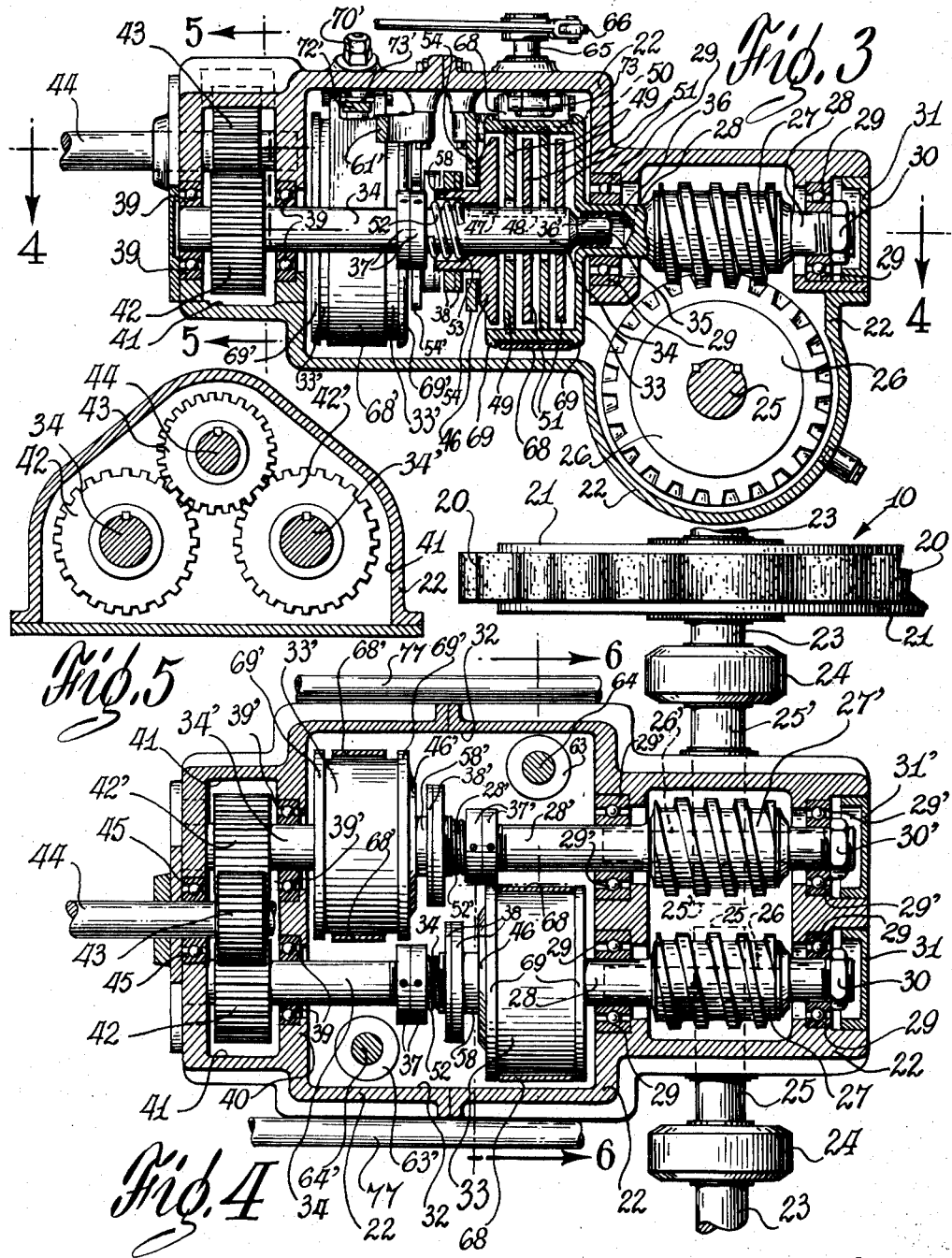

Oct. 27, 1953          J. W. GRENIER          2,656,904
CLUTCH AND BRAKE CONTROL FOR ENDLESS TRACK VEHICLES
Filed June 7, 1950          3 Sheets-Sheet 3
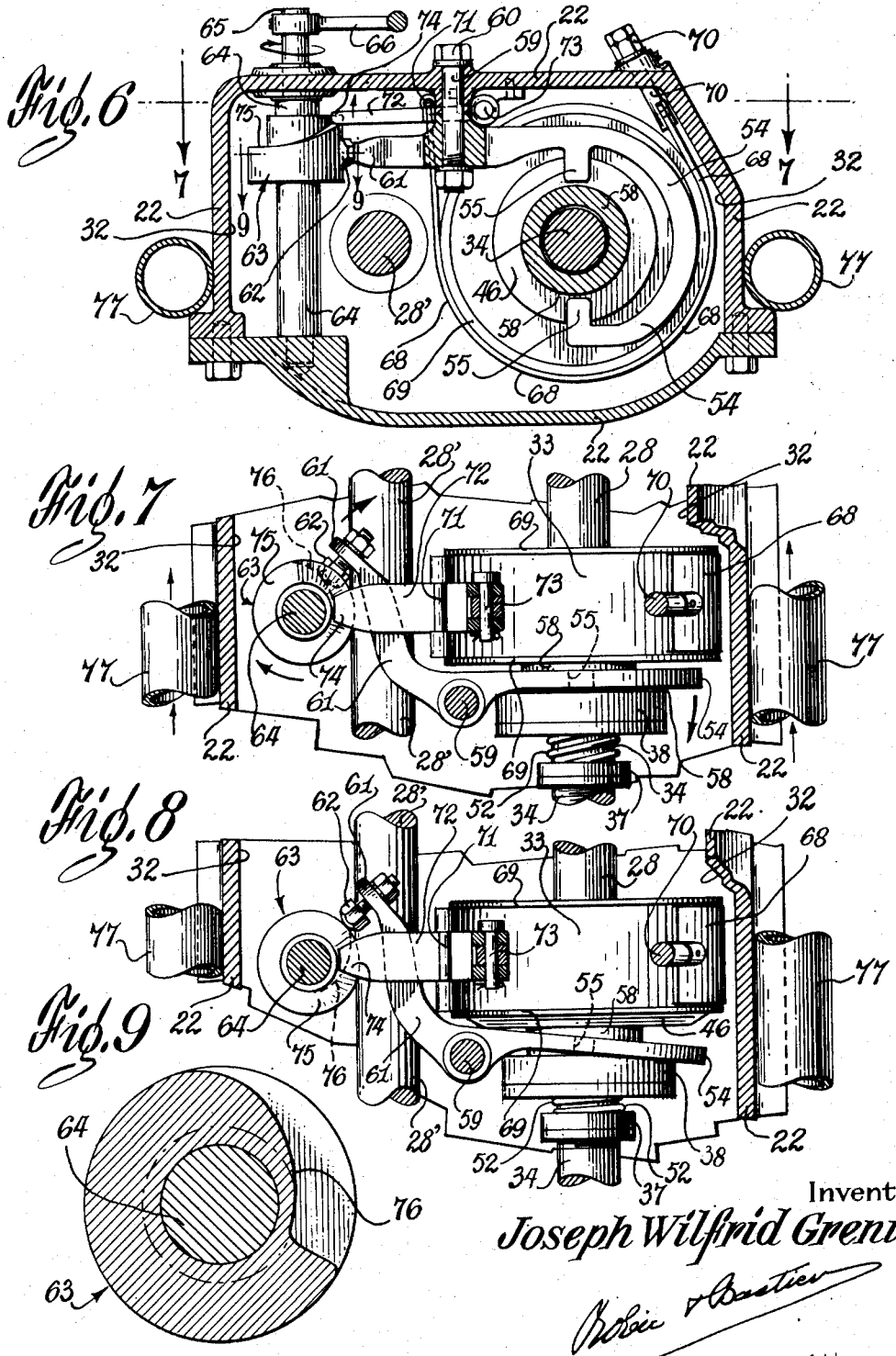
Inventor
Joseph Wilfrid Grenier
Attorneys Patented Oct. 27, 1953

2,656,904

UNITED STATES PATENT OFFICE 2,656,904

CLUTCH AND BRAKE CONTROL FOR ENDLESS TRACK VEHICLES

Joseph Wilfrid Grenier, Giffard, Quebec, Canada

Application June 7, 1950, Serial No. 166,597

1 Claim. (Cl. 192—17)

The present invention relates to an endless track vehicle and more particularly to an endless track vehicle especially adapted to be used over snow covered areas.

The main object according to the present invention is the provision of an endless track vehicle of light weight and yet durable construction for use over snow covered areas and capable of negotiating very rough terrain without becoming snowbound.

Another important object, according to the present invention is the provision in a vehicle of the character described, of a curved upwardly inclined plate member at the front of the vehicle, said plate member being tangentially aligned with the endless tracks in order to facilitate the passage of the vehicle over snow banks in a manner similar to a sleigh.

Still another important object, according to the present invention, is the provision in an endless track vehicle of the character described, of an improved mounting for the track arrangement, which will provide increased strength and lightness to said vehicle.

Yet another important object, according to the present invention, is the provision in an endless track vehicle of the character described of simple steering and braking means comprising a combination brake and clutch assembly of novel construction.

Still another important object, according to the present invention, is the provision in an endless track vehicle of a combination brake and clutch mechanism for each of the endless tracks, said mechanism being actuated by a single control lever for each of said tracks whereby the vehicle, according to the invention, may be steered, stopped and its engine declutched by means of only two control levers.

Still another important object, according to the present invention, is the provision of driving wheels for the endless tracks in a vehicle of the character mentioned, which have a novel and improved construction resulting in a very much increased length of service.

The foregoing and other important objects according to the present invention will become more apparent during the following disclosure and by referring to the drawings in which:

Figure 1 is a perspective view of the endless track vehicle according to the invention;

Figure 2 is a longitudinal sectional elevation along line 2—2 of Figure 1;

Figure 3 is a longitudinal sectional elevation of the combination brake and clutch mechanism according to the present invention;

Figure 4 is a plan section along line 4—4 of Figure 3;

Figure 5 is a cross section along line 5—5 of Figure 3;

Figure 6 is a cross section along line 6—6 of Figure 4;

Figure 7 is a fractional plan section along line 7—7 of Figure 6 showing the clutch in engaged position and the brake in non-braking position;

Figure 8 is a plan section similar to that of Figure 7 showing clutch in disengaged position and the brake in engaged braking position; and Figure 9 is an enlarged plan section of the double cam member for actuating the brake and clutch mechanism according to the invention.

Referring now more particularly to the drawings in which like reference characters indicate like elements throughout, the vehicle, according to the invention, comprises a platform 1 extending substantially horizontally and upwardly curved at the front portion 2, said platform 1 supporting a conventional air-cooled engine 3, a driver's seat 4 and providing room for other desired equipment such as the radio transmitter and receiver 5. The engine and the driver are protected from the weather by means of the hood 6 made in a one-piece unit and preferably hinged at 7 for vertical arcuate movement in order to move the same in an out of the way position for easy access to the engine.

The endless track arrangement of the vehicle, according to the present invention, comprises a plurality of pairs of wheels 8 of equal diameter, a pair of front wheels 9 of smaller diameter and a pair of rear driving wheels 10 for driving the endless tracks 14. The wheels 8 and 9 are preferably provided with tires.

The axles 13 of the above mentioned wheels are independently mounted at each side of the vehicle on two elongated frame members 11, straight for the most part, but upwardly inclined at their front end 12 to support the axle 13' of the smaller front wheels 9. Thus the front ground engaging portion of the tracks 14 is upwardly inclined, being in tangential alignment with a curved upwardly inclined plate member 15 rigidly secured to the platform 2 of the vehicle. Therefore, whenever the vehicle, according to the invention, meets with a snow bank, the plate member 15 will slidingly engage the same and the tracks 14 will follow in a smooth and easy manner.

The frame members 11 are rigidly secured one to the other by means of the cross bars 16 extending transversely of the vehicle under the platform 1.

The endless track arrangement is secured to the platform 1 by means of braces 17 secured at one end to the members 11 and at the other end to the under side of the platform 1, and also by means of the bow-shaped members 18 having upwardly inclined ends 19 secured to the rear and front of the platform on both sides thereof, and having their intermediate portion resting on the outer frame members 11.

The bow-shaped members 18 improve considerably the strength of the vehicle structure, being especially adapted to resist longitudinal thrust on the endless track arrangement.

The rear driving spur wheels 10 consist preferably of a disc shaped core made of rubber or like resilient material and provided with track engaging teeth 20, said resilient core being sandwiched between two flat metallic discs 21 of smaller diameter. The teeth 20, being resilient, snow and ice will be prevented from adhering to the same.

It will be noted that the spur wheels 10 are of substantially the same diameter as the wheels 8 and will also bear on the ground thereby increasing the bearing surface of the tracks 14.

Both endless tracks 14 are independently driven by the engine 3 through a novel combination brake and clutch mechanism, shown in Figure 2 at 22 which denotes the housing of the said mechanism.

The spur wheels 10 are each keyed to independent co-axial shafts 23 secured by means of couplings 24 to the independent co-axial shafts 25, 25' keyed at their inner ends to respective pinions 26, 26' as shown in Figure 3 and in dotted lines in Figure 4.

These co-axial shafts 25, 25' are supported at their inner end within the housing 22, on suitable bearings which have not been shown for purposes of clarity.

The pinions 26, 26' mesh respectively with the worm gears 27 and 27' disposed at right angles to the axis of the shafts 25, 25' in spaced parallel relationship and being rigidly mounted on their respective parallel shafts 28 and 28'. These shafts 28 and 28' are journaled on both sides of their respective worm gears 27 and 27' in suitable ball bearings 29 and 29' and are threaded to receive the nuts 30, 30' which will prevent axial displacement of the shafts. Caps 31, 31' protect the outer bearings 29, 29' from the exterior.

The shaft 28, which has a hollow portion 36 at the inner bearing 29 protrudes within the middle chamber 32 of the housing 22 forming a brake drum 33 of substantial diameter and extending close to the side wall of said chamber 32.

A shaft 34 extends within the brake drum 33 and is co-axial with the shaft 28, having a smaller end 35 rotatably engaging the bushing 36' and the hollow portion 36 of said shaft as shown in Figure 3. The shaft 34 extends transversely within the chamber 32 and journaled at its outer end in the ball bearings 39 mounted in the outer wall of the housing 22 and in a partition 40 which defines another chamber 41 in which are positioned the pinions 42 and 43 keyed respectively to the shaft 34 and to the main driving shaft 44. The latter shaft is journaled in bearing 45 and is connected through suitable universal joints to the power take-off of the engine 3.

The brake drum 33 houses a clutch arrangement comprising an actuating plate member 46 and dependent sleeve 58 rotatively connected to the shaft 34 but longitudinally slidable thereon, having a key 47 engaging the key way 48 of the shaft 34. Alternate clutch discs 49 are rotatively connected to the brake drum 33 engaging the key way 50 of the same in which they are slidably mounted. On the other hand, the clutch discs 51 positioned between the clutch discs 49 or adjacent one of the same, are rotatively connected to the shaft 34 but are slidable thereon engaging the key way 48. Thus upon displacement of the actuating plate member 46 towards the interior of the brake drum 33 and under the urge of the coil spring 52, which abuts the locking rings 37 in threaded engagement with the shaft 34 and a shoulder 53 made within the sleeve 58 of the member 46, the above mentioned clutch discs will come into mutual contact thereby rotatively connecting the driving shaft 34 to the brake drum 33 and consequently to the worm gear 27.

The plate member 46 is longitudinally displaced along the shaft 34 by means of a fork 54, shown in Figures 6 to 8, but omitted in Figure 4 for purposes of clarity; said fork having inwardly projecting fingers 55 engaging the groove defined by the plate member 46 and the locking rings 38 in threaded engagement with the free end of the sleeve 58, said fork 54 being further pivoted on the bolt 59 which is secured to the top wall of the housing 22 by means of the nut 60 as shown in Figure 6.

The locking rings 37 and 38 serve to adjust respectively the tension of the spring 52 and the play of the fingers 55 of the fork 54.

The free end 61 of the fork 54 is bent back as shown in Figure 7 and supports an adjustable screw 62, the head of which is adapted to slidably engage the peripheral cam surface 76 of a cylindrical double cam member 63 which is keyed to the vertical shaft 64. The shaft 64 is journaled at its bottom end in the wall of the casing 22 and protrudes through the top wall of the same at its top end to form a stud 65 to which is secured the actuating lever 66 for rotating the double cam member 63.

The lever 66 is linked by any suitable means to the control lever 67 shown in Figure 2 disposed adjacent the driver's seat 4. Thus, upon actuation of the lever 67 the clutch arrangement, according to the invention, which is normally in engaged position as shown in Figure 7 will be released to take a position as shown in Figure 8; for this operation the double cam member 63 will be rotated in a clockwise direction whereby the screw 62 will side outwardly against the peripheral cam surface 76, displacing the fork 54 away from the brake drum 33 of the invention.

The same movement of the lever 67 will effect the braking of the corresponding endless track 14. This braking action is achieved by means of the brake band 68 enclosing a substantial portion of the periphery of the brake drum 33 between the edge flanges 69 of the same; said brake band 68 is adjustably secured at one end to the wall of the housing 22 by means of the nut and bolt assembly 70 and is forked and bent at its other end to receive the pin 71 which rests on the flat lever member 72 intermediate both ends of the same.

The lever 72 is pivoted at its inner end to the top wall of the housing 22 on pivot pin 73 and bears at its free end 74 on the top cam face 75 of the double cam member 63. The cam face 75 has a suitable grade for actuating the lever 72 in a vertical plane to apply or release the brake by means of the brake band 68.

Therefore, by means of a single control lever 67 and by means of a single stroke of the same, the engine 3 may be disconnected from the driving wheel 10 corresponding to said lever 67 while in the same stroke, braking will be applied to the same driving wheel. It is seen that upon the operation of the single control lever 67, the corresponding endless track 14 will be stopped and blocked, and the vehicle, according to the invention, will turn in the direction of the blocked track. Thus, a simple and efficient steering operation is achieved.

While the elements of the combination brake and clutch mechanism, according to the invention has been described for the right hand track of the vehicle, it is obvious that the same elements may be repeated for the left hand track of the same vehicle, in exactly the some order, but for purposes of reducing the space required for the combination mechanism, according to the invention, it is preferable to dispose the relatively large brake drums 33 in a staggered position as shown in Figure 4. This is why the elements for the left hand track 14 of the vehicle are made somewhat different than the same elements for the right hand track, as will be described hereafter.

As shown in Figure 4, the shaft 28' corresponding to the shaft 28 extends within the chamber 32 within the brake drum 33' and within the shaft 34, which is tubular and which extends the whole length of the brake drum 33'. Suitable clutch discs, not shown, are slidably keyed on the tubular shaft 34' while alternate clutch discs are slidably keyed to and within the brake drum 33' in a manner substantially the same as the clutch discs 49. The brake drum 33' is itself rigidly secured to the actuating plate member 46' which, otherwise, has the same form and is similarly mounted on the shaft 34' as the corresponding plate member 46 shown in Figure 3. The plate member 46' is provided with the sleeve 58' and locking rings 38' to maintain the fork 54' in engagement with said plate member. Fork 54' has a free end 61'. But, in this case the brake drum 33' is also displaceable longitudinally on the shaft 34' for the clutching and declutching operation. The brake band 68' acts in the same manner as the brake band 68 but is narrower in order to have a suitable play between the drum flanges 69'. One end of the brake band 68' is secured to the housing 22 by the nut and bolt assembly 70' and the other end thereof is actuated by the means of the flat lever 72' pivoted at 73'. A coil spring 52', abutting the locking rings 37' mounted on shaft 28' normally urges the clutch mechanism into an engaged position. The hollow shaft 34' is journaled in bearings 39' and supports the gear 42' which meshes with the gear 45 of the main driving shaft 44. The drum 33' and associated member 46' are longitudinally displaced by means of a fork identical with the fork 54 previously described. Obviously the brake band 68' and the fork will be actuated by means of a double cam member 63' mounted on shaft 64' both rotated by means of a control lever identical with the control lever 67 previously described.

Thus upon operation of either one of the control levers 67 the vehicle, according to the invention, will rotate in the direction of the operated lever, while upon operation of both levers at the same time the vehicle will automatically be brought to a complete stop and the engine will be declutched from both tracks 14.

In order to ensure smooth driving despite very cold weather, and more particularly in order to maintain the lubricant filling the housing 22 in a suitable liquid state, the exhaust pipes 77 coming from the engine are preferably disposed close to both sides of the housing 22 for heating the same.

The whole brake and clutch unit just described, is seen to take a minimum of space and is readily disposed at the rear of the vehicle between the endless tracks 14 and under the top threads thereof, thereby permitting of reducing to a minimum the distance separating the endless tracks in order to prevent snow from accumulating between the same to cause stoppage of the vehicle.

While a preferred embodiment, according to the present invention, has been illustrated and described it is understood that various modifications may be resorted to without departing from the spirit and scope of the appended claim.

What I claim is:

A combination brake and clutch mechanism comprising a housing, a driving and a driven shaft in alignment with each other and extending in said housing, a brake drum keyed to said driven shaft, axial therewith and surrounding said driving shaft, interengageable clutch means depending respectively from said brake drum and said driving shaft and longitudinally displaceable with respect thereto, a thrust plate on said driving shaft longitudinally displaceable for causing mutual engagement of said clutch means, a first lever pivoted intermediate its ends about a pivot fixed to said housing and perpendicular to said shafts, the inner end of said first lever forming a fork contacting said thrust plate, a brake band surrounding said brake drum and attached at one end to said housing, a second lever pivoted at its inner end about a pivot fixed to said housing and parallel to said shaft, said second lever connected intermediate its ends to the free end of said brake band, a cam element rotatably mounted in said casing about an axis perpendicular to said shafts and having two mutually perpendicular cam faces respectively engaging the outer ends of said first and second lever and a single control member for rotating said cam member, whereby said driving and driven shafts are declutched and said driven shaft is braked upon rotation of said cam member in one direction.

JOSEPH WILFRID GRENIER.

References Cited in the file of this patent

UNITED STATES PATENTS

| Number | Name | Date |
| --- | --- | --- |
| 1,184,008 | Noreluis | May 23, 1916 |
| 1,216,962 | Desmarais | Feb. 20, 1917 |
| 1,251,344 | Daman | Dec. 25, 1917 |
| 1,267,186 | Conces et al. | May 21, 1918 |
| 1,423,642 | Beal et al. | July 25, 1922 |
| 1,463,445 | Smith | July 31, 1923 |
| 1,637,722 | Austin | Aug. 2, 1927 |
| 2,328,804 | Hollman et al. | Sept. 7, 1943 |
| 2,366,433 | Bridwell et al. | Jan. 2, 1945 |

FOREIGN PATENTS

| Number | Country | Date |
| --- | --- | --- |
| 883,795 | France | July 16, 1943 |